(No Model.)
C. M. STETSON.
NUT AND BOLT LOCK.
No. 490,176. Patented Jan. 17, 1893.
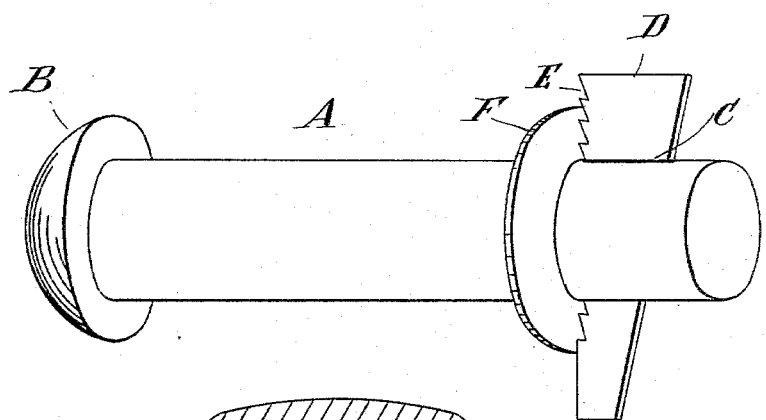
Fig: 1.
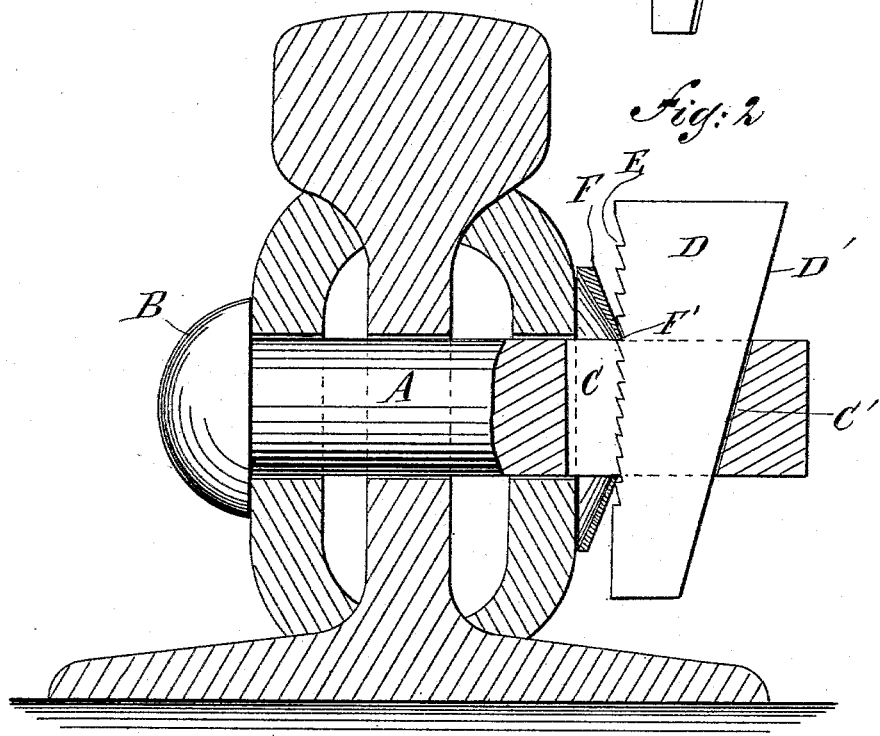
Fig: 2.
WITNESSES:
Chas. Nida.
C. Sedgwick
INVENTOR
C. M. Stetson
BY
Munn & Co.
ATTORNEYS.

UNITED STATES PATENT OFFICE.

CHARLES MUSGROVE STETSON, OF ROSARIO, ARGENTINE REPUBLIC.

NUT AND BOLT LOCK.

SPECIFICATION forming part of Letters Patent No. 490,176, dated January 17, 1893.

Application filed May 4, 1892. Serial No. 431,811. (No model.)

*To all whom it may concern:*

Be it known that I, CHARLES MUSGROVE STETSON, a citizen of the United States, at present residing at Rosario de Santa Fé, Argentine Republic, have invented a new and Improved Nut-Lock, of which the following is a full, clear, and exact description.

The invention is an improvement in the class of nut-locks in which a key and a concave washer are employed in connection with a slotted bolt. In my improvement the washer is concavo-convex, and the key is provided with ratchet teeth adapted to engage the edge of the washer, as hereinafter described.

Reference is to be had to the accompanying drawings forming a part of this specification, in which similar letters of reference indicate corresponding parts in both the figures.

Figure 1 is a perspective view of the improvement; and Fig. 2 is a transverse section of the same.

The bolt A, on which the lock is applied, is provided at one end with the usual head B, and near its other end is formed with a diametrically extending slot C, having its outer end C' beveled, as is plainly shown in Fig. 2. In this slot C is adapted to pass a key D, having a beveled edge D' adapted to pass onto the beveled end C' of the slot, so that when the key is driven in the slot, it moves inward at its front edge toward the head B of the bolt. The shank of the bolt can have the usual square shoulder, if desired, to prevent it from turning; or, the bolt can be made to fit the holes it is to go through, be they round, square, oval, &c.

On the front edge of the key D are formed teeth E, adapted to engage the raised edge F' of a concavo-convex washer F, held on the bolt A in front of the key D and adapted to rest on one of the articles or devices to be fastened together. The washer F is preferably made tapering in cross section, as is plainly shown in Fig. 2, the smallest end being at the edge of the opening to be engaged by corresponding teeth E of the key D. The outer edge of the washer is adapted to rest on the surface of one of the articles to be fastened together by the bolt A. Now, when the several parts are in place, as shown in Fig. 1, the operator can securely lock the bolt A in position by driving the key D inward, so that the key in traveling forward, as previously mentioned, presses on the washer F, thus firmly engaging the lock with one of the articles to be fastened together. At the same time the teeth E slide over the inner edge of the washer and finally two teeth engage the said edge when the key D has been driven into the desired position, so that the key D is locked in position by the back of its teeth E engaging the inner edge of the washer F. Thus the lock is also locked in place on the bolt A. If desired, the washer F may be applied in a reverse way, that is, the outer edge may extend outward to be engaged by the teeth E, while the inner edge rests against the surface of one of the articles to be fastened together by the bolt A.

Having thus described my invention, I claim as new, and desire to secure by Letters Patent:—

1. The combination with the longitudinally-slotted bolt and the concavo-convex washer, of the key having one side edge provided with ratchet teeth adapted to engage the edge of the washer, as shown and described.

2. A lock, comprising a bolt formed with a slot having an inclined end, a concavo-convex washer held on the said bolt, and a toothed key adapted to pass into the said slot to engage, with its teeth, the raised edge of the said washer, substantially as shown and described.

CHARLES MUSGROVE STETSON.

Witnesses:
ALANSON S. HALL,
WILLIS E. BAKER.